(12) United States Patent
Yamagishi et al.

(10) Patent No.: US 8,226,244 B2
(45) Date of Patent: Jul. 24, 2012

(54) IMAGE DISPLAY DEVICE

(75) Inventors: Shigekazu Yamagishi, Osaka (JP); Kazunori Tanabe, Okayama (JP); Shuu Nanba, Osaka (JP)

(73) Assignee: Panasonic Corporation, Osaka (JP)

( * ) Notice: Subject to any disclaimer, the term of this patent is extended or adjusted under 35 U.S.C. 154(b) by 263 days.

(21) Appl. No.: 12/668,717

(22) PCT Filed: Jul. 9, 2008

(86) PCT No.: PCT/JP2008/001833
§ 371 (c)(1),
(2), (4) Date: Jan. 12, 2010

(87) PCT Pub. No.: WO2009/008166
PCT Pub. Date: Jan. 15, 2009

(65) Prior Publication Data
US 2010/0171935 A1  Jul. 8, 2010

(30) Foreign Application Priority Data
Jul. 12, 2007  (JP) .................................. 2007-182916

(51) Int. Cl.
*G03B 21/16* (2006.01)

(52) U.S. Cl. ................ 353/52; 353/30; 353/31; 353/33; 353/38; 353/54; 353/57; 353/58; 353/60; 353/85; 353/99; 353/119; 353/122

(58) Field of Classification Search ............... 353/30, 353/31, 33, 38, 52, 54, 57, 58, 60, 85, 99, 353/119, 122; 362/114, 294, 362, 373, 613, 362/615; 361/676, 688, 689, 697–699, 703, 361/711, 831; 349/7, 8, 9, 161; 315/32, 315/113, 117, 151
See application file for complete search history.

(56) References Cited

U.S. PATENT DOCUMENTS

| | | | | |
|---|---|---|---|---|
| 5,398,041 A * | 3/1995 | Hyatt | ........................ | 345/88 |
| 6,832,849 B2 * | 12/2004 | Yoneda et al. | ................ | 362/551 |
| 7,119,501 B2 * | 10/2006 | Young | ........................ | 315/307 |
| 7,252,385 B2 * | 8/2007 | Engle et al. | ........................ | 353/52 |
| 7,264,359 B2 * | 9/2007 | Kawahara et al. | ............ | 353/54 |
| 7,309,145 B2 * | 12/2007 | Nagata et al. | ................ | 362/294 |
| 7,543,962 B2 * | 6/2009 | Miwa et al. | ................... | 362/294 |
| 2001/0013924 A1 * | 8/2001 | Yokoyama et al. | ............ | 353/52 |
| 2005/0201107 A1 | 9/2005 | Seki | | |
| 2008/0042578 A1 * | 2/2008 | Arai et al. | ........................ | 315/32 |

FOREIGN PATENT DOCUMENTS

| | | |
|---|---|---|
| JP | 2004-317956 A | 11/2004 |
| JP | 2005-121890 A | 5/2005 |
| JP | 2007-133300 A | 5/2007 |
| JP | 2008-158390 A | 7/2008 |

* cited by examiner

*Primary Examiner* — Georgia Y Epps
*Assistant Examiner* — Sultan Chowdhury
(74) *Attorney, Agent, or Firm* — Hamre, Schumann, Mueller & Larson, P.C.

(57) ABSTRACT

LED modules (1R, 1G, 1B) for respectively emitting red, green and blue colors of light, illumination optical systems (2R, 2G, 2B) for guiding light from the LED modules, and a liquid crystal panel (7) for modulating the light from the LED modules guided by the illumination optical systems on the basis of an image signal are placed. The LED modules are provided with respective cooling units connected to the backside thereof through spreaders (11R, 11G, 11B) as thermal conductive members. Only the cooling device for the red LED module (1R) is formed by using a red Peltier device (12) as a thermoelectric element capable of controlling heating and absorbing heat. Efficient temperature control by appropriately using a Peltier device for cooling the plurality of solid light sources that emit colors of light different from each other becomes possible.

7 Claims, 6 Drawing Sheets

IMAGE DISPLAY DEVICE

TECHNICAL FIELD

The present invention relates to image display devices that display images by irradiating an image display element with light from a plurality of solid light sources, and in particular to an image display device including a cooling unit using a thermoelectric element for cooling the plurality of solid light sources.

BACKGROUND ART

Conventionally, white light sources, such as a cold cathode tube and a high pressure mercury lamp, have been utilized as light sources for image display devices. In a direct view image display device such as a liquid crystal monitor, red, green and blue colors of light that is wavelength-selected by a color filter, which is made of a material that absorbs unnecessary wavelength light from white light from the light source, is guided to liquid crystal elements for red, green and blue signals.

Further, in a projection type image display device such as a projector, white light is separated into red, green and blue colors of light with the use of a dichroic mirror or a dichroic filter having a wavelength selection function using a thin-film technique, and modulated with the use of a liquid crystal panel or a mirror device, thereby displaying images.

In the light sources as described above, however, a wavelength band that can be used for each color of light becomes narrow in order to improve the color reproduction characteristics of each color of light, and as a result, a light utilization efficiency declines significantly. Further, in the case of high pressure mercury lamps in particular, they have maintenance-related problems, such as a short life span (several thousand hours) and the possibility of bursting.

For these reasons, liquid crystal televisions, projectors, etc. using light-emitting diodes (hereinafter referred to as LEDs) as solid light sources as individual light sources for red, green and blue have become commercially available in recent years. Although the light output of LEDs may not be sufficient, the level of chromaticity of each color of light is unique, which may not be achieved by conventional products.

On the other hand, the use of LEDs involves the following problems. High-brightness LEDs generate a large amount of heat, so that in order to obtain long life spans, a high-performance cooling unit is essential. Further, among red, green and blue LEDs, a red LED is different from green and blue LEDs in a degree of variation in light conversion efficiency and emission spectrum in response to a variation in the junction temperature.

FIG. 6 is a diagram showing characteristics of red, green and blue LEDs disclosed by Lumileds Inc. The characteristics in the drawing show that the light conversion efficiency of each LED changes in response to a variation in each junction temperature. Further, as can be seen from the characteristics in the drawing, the variation of red is larger than those of green and blue. This means that even if white balance is adjusted once, a color gamut occurs due to a significant change in output of each color of light when the amount of heat generation changes as a result of any factor, such as a change in ambient temperature, thereby making desired color reproduction difficult.

Therefore, as shown in FIG. 7, Patent document 1 discloses that a Peltier device as a thermoelectric element is used for a cooling means for an LED 60. A Peltier device generates or absorbs heat when a current is fed to the junction between two thermoelectric materials (bismuth and tellurium). The Peltier device shown in FIG. 7 has a configuration in which N-type and P-type semiconductors 61 and 62 are joined to each other through copper electrodes 63 and 64, and on the outside of the electrodes, ceramics 65 and 66 as electrical insulators having relatively favorable thermal conductivity are placed respectively. The LED 60 as the object to be cooled is joined to the ceramic 65, and a heat sink 67 for dissipating heat is jointed to the ceramic 66.

By properly using the Peltier device and controlling currents, the LED connected to the Peltier device can be cooled or it can be maintained at a certain temperature. By increasing the number of pairs of the semiconductors or increasing the size of the element itself, it is possible to increase the power with which the Peltier device can be operated.

Patent document 1; JP 2005-121890 A

DISCLOSURE OF INVENTION

Problem to be Solved by the Invention

However, optimum temperature control cannot be carried out by providing Peltier devices for all of the red, green and blue LEDs and performing common control. That is, as can be seen from the characteristics shown in FIG. 6, in that case, the control is to be performed in accordance with the red LED, which has a large color gamut. Accordingly, cooling becomes insufficient for the green LED, which has a large amount of heat generation. Further, since the blue LED is less susceptible to temperature and does not have a large amount of heat generation like the green LED, the size of the device is unnecessarily increased for cooling the blue LED, causing power losses.

With the foregoing in mind, it is an object of the present invention to provide an image display device including a cooling unit for solid light sources, which can prevent an increase in the size of the plurality of solid light sources that emit colors of light different from each other as well as power losses and also can perform efficient temperature control using a Peltier device.

Means for Solving Problem

The image display device of the present invention basically includes: a plurality of solid light sources for respectively emitting at least red, green and blue colors of light; an illumination optical system for guiding light from the plurality of solid light sources; and an image display element for modulating the light from the plurality of solid light sources guided by the illumination optical system on the basis of an image signal.

In order to solve the above-described problems, in the image display device of the present invention having a first configuration, the plurality of solid light sources are provided with respective cooling units connected to a backside thereof through a thermal conductive member, and among the plurality of cooling units, only the cooling unit connected to the solid light source for emitting red light is formed by using a thermoelectric element capable of controlling heating and absorbing heat.

In the image display device of the present invention having a second configuration, in addition to the above basic components, the plurality of solid light sources are provided with respective cooling units connected to backside thereof through a thermal conductive member, at least the cooling unit connected to the solid light source for emitting red light is formed by using a first thermoelectric element capable of controlling heating and absorbing heat, and the cooling unit connected to the solid light source for emitting green light is formed by using a second thermoelectric element having a larger capacity than the first thermoelectric element and capable of controlling absorbing heat.

EFFECT OF THE INVENTION

According to the present invention, it is possible to provide an image display device provided with a cooling system capable of efficiently controlling the temperatures of a plurality of solid light sources that emit colors of light different from each other by appropriately using a thermoelectric element, which device can prevent an increase in its size as well as power losses.

Figure 1:
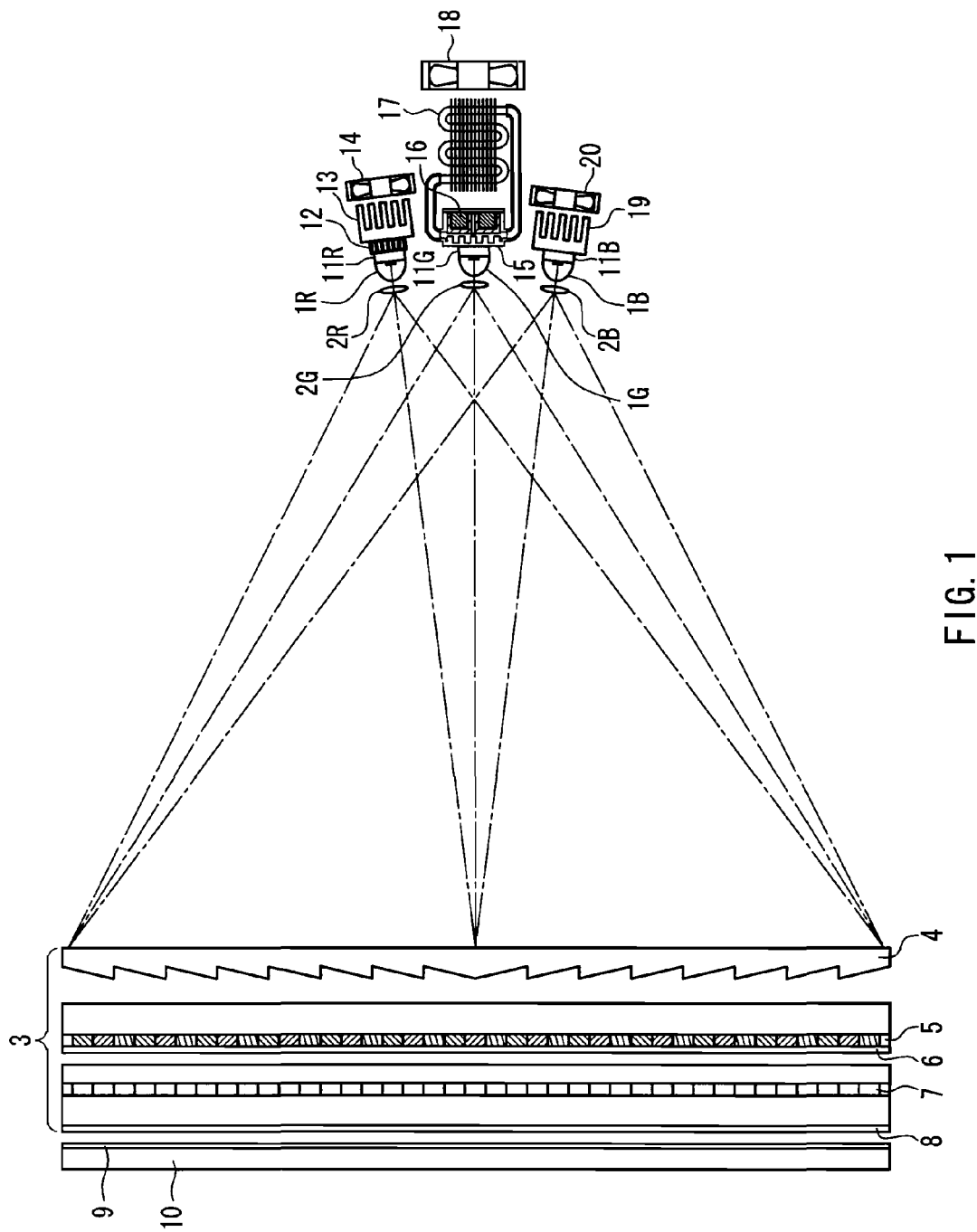
FIG. 1 is a plan view showing a configuration of an image display device according to Embodiment 1 of the present invention.

DESCRIPTION OF REFERENCE NUMERALS 1R, 31R red LED module
1G, 31G green LED module
1B, 31B blue LED module
2R red illumination optical system
2G green illumination optical system
2B blue illumination optical system
3 optical modulator
4 Frensnel lens
5 color filter
6 incident-side polarizer
7 liquid crystal panel
8 exit-side polarizer
9 diffusion layer
10 front panel
11R, 41R red spreader
11G, 41G green spreader
11B, 41B blue spreader
12, 42 red Peltier device
13, 19, 21, 44, 53, 67 heat sink
14, 18, 20, 45, 52, 54 cooling fan
15, 47 heat receiving unit
16, 48 pump
17, 49 radiator
32 red reflecting dichroic mirror
33 condensing optical system
34 blue reflecting dichroic mirror
35 rod integrator
36 illumination optical system
37 planer mirror
38 concave mirror
40 projection lens
43 thermo sensor
46 green Peltier device
50 pipe
51 refrigerant
60 LED
61 N-type semiconductor
62 P-type semiconductor
63, 64 copper electrode
65, 66 ceramic

DESCRIPTION OF THE INVENTION

The image display device of the present invention, having the basic structure as described above, can be configured as follows.

That is, the image display device having the first or second configuration may include a thermo sensor placed in the vicinity of the solid light sources, and the solid light source for emitting red light is controlled so that a junction temperature thereof is maintained at a constant temperature in accordance with a temperature detected by the thermo sensor.

Further, the plurality of cooling units may include a cooling unit having a heat sink connected to the thermal conductive member and a cooling unit having a heat sink connected to the thermal conductive member through the thermoelectric element.

Or, at least one of the cooling units may include a heat receiving unit connected to the thermal conductive member, a pipe connected to the heat receiving unit, a pump connected to the pipe, a refrigerant driven by the pump so as to be circulated through the pipe, and a radiator placed on the pipe, and the refrigerant may be circulated to remove heat from the heat receiving unit after being cooled by the radiator.

In such a configuration, the thermoelectric element may be placed so as to be interposed between the thermal conductive member and the heat receiving unit.

In particular, it is possible to have a configuration such that the refrigerant is circulated among a plurality of heat receiving unit in series and the refrigerant is cooled by one radiator.

The image display device having the first configuration may be configured such that the cooling unit for the solid light source for emitting blue light has a heat sink connected to the thermal conductive member, the cooling unit for the solid light source for emitting red light has a heat sink connected to the thermal conductive member through the thermoelectric element, the cooling unit for the solid light source for emitting green light has a heat receiving unit connected to the thermal conductive member, a pipe connected to the heat receiving unit, a pump connected to the pipe, a refrigerant driven by the pump so as to be circulated through the pipe, and a radiator placed on the pipe, whereby the refrigerant is circulated to remove heat from the heat receiving unit after being cooled by the radiator.

The image display device having the second configuration may be configured such that the cooling unit for the solid light source for emitting blue light has a heat sink connected to the thermal conductive member, the cooling unit for the solid light source for emitting red light has a heat sink connected to the thermal conductive member through the first thermoelectric element, the cooling unit for the solid light source for emitting green light has a heat receiving unit connected to the thermal conductive member through the second thermoelectric element, a pipe connected to the heat receiving unit, a pump connected to the pipe, a refrigerant driven by the pump so as to be circulated through the pipe, and a radiator placed on the pipe, whereby the refrigerant is circulated to remove heat from the heat receiving unit after being cooled by the radiator.

Further, in the image display device having any one of the above configurations, the thermoelectric element may be a Peltier device.

Further, the image display device having any one of the above configuration may include a projection optical system provided so that an image on the image display element can be projected onto a screen placed in front of the image display device.

Hereinafter, an image display device according to embodiments of the present invention will be described with reference to the drawings.

Embodiment 1

FIG. 1 shows a configuration of an image display device according to Embodiment 1 of the present invention. In this device, LED modules for emitting R, G and B colors of light, namely, a red LED module 1R, a green LED module 1G and a blue LED module 1B are provided.

Although it is not shown in the drawing, the LED modules 1R, 1G and 1B for the respective colors of light as solid light sources have a configuration in which an LED die is mounted on a metal substrate for dissipating heat, with an electric insulation layer being interposed between the die and the substrate. Further, the LED die is connected to an LED driving power supply through an electrode, and a converging lens is placed in front of the LED die.

Light outputted from the red LED module 1R passes through an illumination optical system 2R and is guided to an optical modulator 3. Similarly to the red light, light outputted from the green LED module 1G passes though an illumination optical system 2G and is guided to the optical modulator 3. Similarly to the red light, light outputted from the blue LED module 1B passes though an illumination optical system 2B and is guided to the optical modulator 3.

The optical modulator 3 is composed of a Fresnel lens 4, a color filter 5, an incident-side polarizer 6, a liquid crystal panel 7 as an image display element (spatial light modulation element) and an exit-side polarizer 8.

At the color filter 5, the light outputted from the red LED module 1R only passes through a red transmission filter region. Since blue and green transmission filter regions adsorb the red light, the red light does not pass through these regions. Similarly, the light outputted from the green LET module 1G only passes through the green transmission filter region and the light outputted from the blue LED module 1B only passes through the blue transmission filter region.

Among incident light, the incident-side polarizer 6 only allows light in one polarization direction to pass therethrough. The liquid crystal panel 7 is composed of two-dimensionally arranged pixels that can independently control the state of a liquid crystal on the basis of an external signal.

Among these pixels, those that are controlled in accordance with a red color signal are placed in the position corresponding to the red transmission filter region of the color filter 5. Likewise, pixels that are controlled in accordance with green and blue color signals are placed respectively in the positions corresponding to the green transmission filter region and the blue transmission filter region of the color filter 5. The exit-side polarizer 8 allows polarized light in the transmission axis direction to pass therethrough but absorbs polarized light in the orthogonal direction.

Since the optical modular 3 operates in a known manner and the operation does not significantly relate to the import of the present embodiment, it will not be described in detail. An optical image is formed on the liquid crystal panel 7. Light that passed through the optical modulator 3 enters a front panel 10 including a diffusion layer 9 and the light is emitted towards the observer side. In this way, color images are displayed.

A red Peltier device 12 as a thermoelectric element is provided on the back of the red LED module 1R through a red spreader 11R as a thermal conductive member. The spreader diffuses heat as well as conducts heat so as to improve the cooling efficiency. By being current-controlled by a circuit (not shown), the red Peltier device 12 can perform heating or cooling by absorbing heat from the surface of the red spreader 11R.

A heat sink 13 is provided on the surface of the red Peltier device 12 opposite to the surface provided with the red spreader 11R, and heat is dissipated properly by an adjacent cooling fan 14.

A heat receiving unit 15 is coupled to the back of the green LED module 1G through a green spreader 11G as a thermal conductive member. A pump 16 is included in the heat receiving unit 15, and a radiator 17 is connected to this unit through a pipe. A cooling fan 18 is placed adjacent to the radiator 17, and a liquid cooling module for taking heat away from the radiator 17 is formed. A refrigerant flows through the pipe and removes heat from the green LED module 1G through the heat receiving unit 15. In comparison with a case of solely using a heat sink, this heat removal action is sufficiently effective for a large amount of heat.

A heat sink 19 is coupled to the back of the blue LED module 1B through a blue spreader 11B as a thermal conductive member. A cooling fan 20 is placed adjacent to the heat sink 19, so that heat can be dissipated efficiently.

Hereinafter, the reasons for employing the configuration as described above will be described. The present embodiment employs a configuration in which a tolerance to heat generation becomes smaller in order of green, blue and red. This configuration is selected because the heat generation of the green LED module becomes the largest among the LED modules when taking the white balance of a projection image into consideration.

Generally, the brightness proportion of red, green and blue for achieving white balance is determined to be about 3:6:1. On the other hand, according to data (LUXEON 3, Technical Data Sheet) disclosed by Lumileds Inc., a major manufacturer of high-brightness LEDs, red, green and blue are 34 (lm)/w, 20 (lm)/w and 8 (lm)/w, respectively, when calculating at a junction temperature of 25° C. Therefore, the proportion of input power to the respective colors for achieving the above-mentioned required brightness proportion is 1:3.4:1.4.

Here, it is assumed that, a thermal resistance at a portion from the junction to the surface of each LED module connected to the cooling system is 5° C./W, a thermal resistance at each heat sink is 2.5° C./W and a thermal resistance at the liquid cooling module is half of that at each heat sink. The liquid cooling module is provided only for the green LED module 1G having the largest input power among the LED modules, and the red LED module 1R and the blue LED module 1B are cooled using the heat sinks. At this time, a junction temperature $T_{jrb}$ of each of the red and blue LED modules and a junction temperature $T_{jg}$ of the green LED module can be expressed as follows.

In the case of cooling by heat sinks (red, blue):

$$T_{jrb} = (5+2.5) \times \text{input power} + \text{outside air temperature} + \text{increase in inner set temperature}$$

In the case of liquid cooling (green):

$$T_{jg} = (5+2.5/2) \times \text{input power} + \text{outside air temperature}$$

According to this configuration, each of the junction temperatures is well balanced. In other words, it is possible to reduce the difference among the respective LED junction temperatures so as to adjust each junction temperature to be within each permissible temperature range.

The junction temperature proportion of red, green and blue is 73° C.: 88° C.:89° C., where the power of red, green and blue is 3 W, 10.2 W and 4.3 W, outside air temperature is 25° C., and an increase in the inner set temperature is 10° C.

Figure 6:
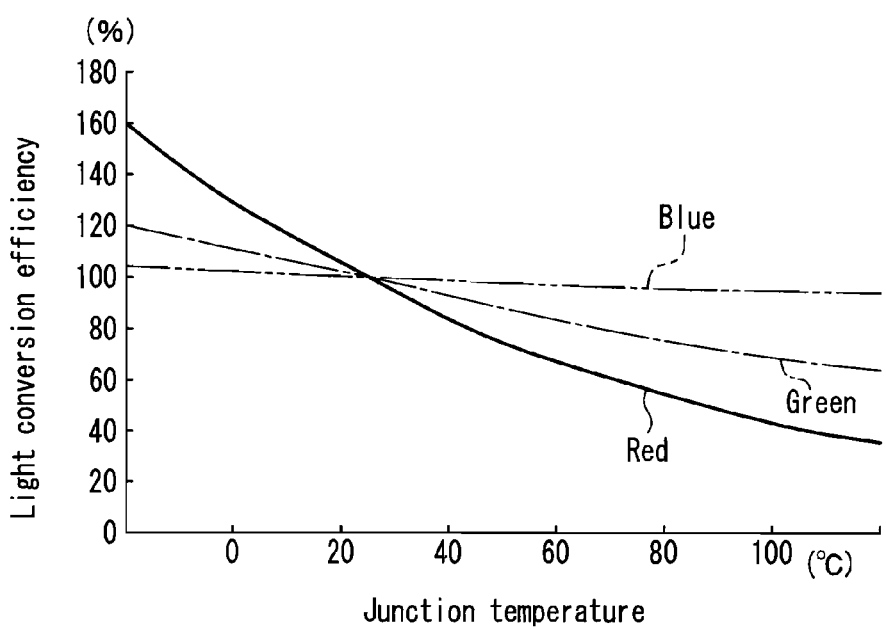
FIG. 6 is a graph showing a relationship between LED junction temperature and light emission efficiency
Figure 7:
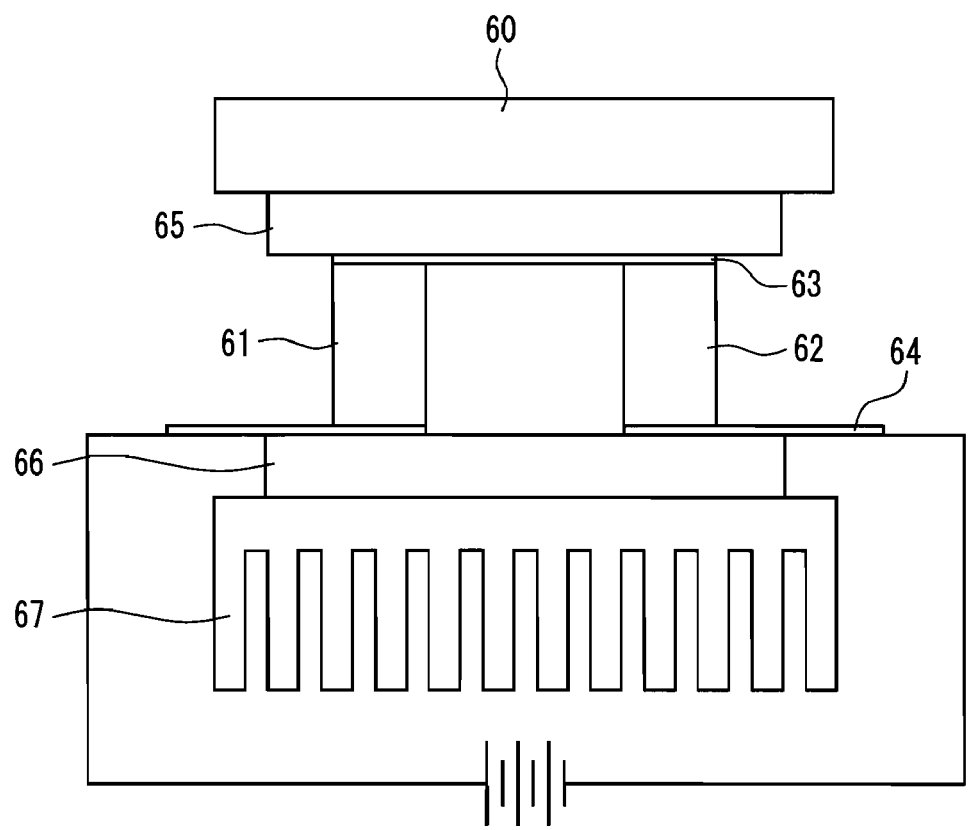
FIG. 7 is a diagram showing a conventional LED cooling system using a Peltier device.

It is also necessary to maintain the junction temperature of each LED at a reliability assurance temperature or less in order to maintain each life span. On the other hand, as described above with reference to FIG. 6, it has been known that the output of each LED changes according to its temperature. Since the output of the red LED in particular changes significantly, white balance formed by three primary colors changes when the junction temperature merely is maintained at the reliability assurance temperature or less.

Further, a shift in the wavelength of output light occurs due to a change in junction temperature, although this will not be described in detail herein. Thus, in order to achieve faithful color reproduction, at least the junction temperature of the red LED module needs to be maintained at a constant temperature. Therefore, a type of Peltier device that can achieve heating or cooling by absorbing heat with high reliability is used for the red Peltier device 12 mentioned above.

As described above, since this type of Peltier device has a large internal thermal resistance, there is a limit to the amount of heat with which the Peltier device can deal. However, since the power of the red LED module itself is not relatively high, it is possible to obtain images with sufficient brightness within the power range in which this Peltier device can be utilized.

Figure 2:
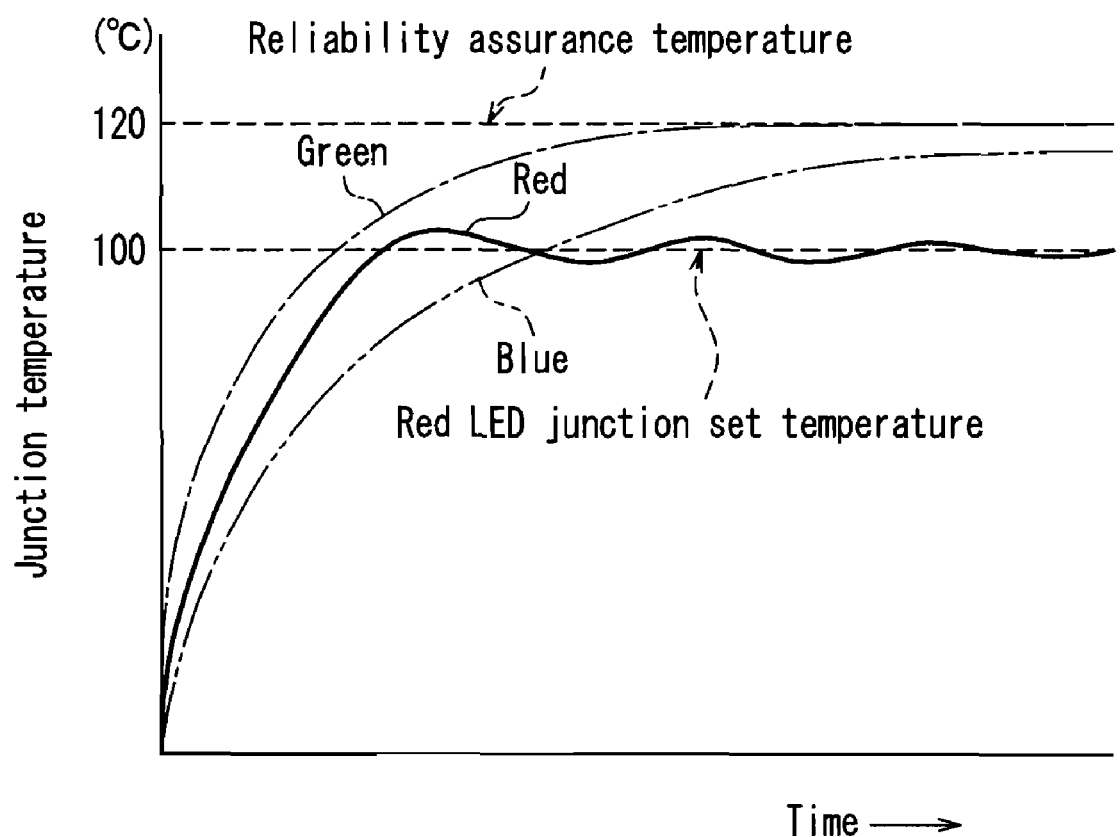
FIG. 2 is a graph showing a state of LED junction temperature control in the same image display device.

A state of LED junction temperature control in the image display device of the present embodiment will be described. FIG. 2 shows a change in each LED junction temperature with the passage of time. The vertical axis indicates junction temperature and the horizontal axis indicates a lapse of time after starting illumination. When the red, green and blue LED modules are driven beyond the reliability assurance temperature, target life spans cannot be achieved due to a decline in brightness. Thus, they need to be maintained at a temperature equal to or less than the reliability assurance temperature. In FIG. 2, the reliability assurance temperature is 120° C.

As can be seen from the drawing, with regard to the green LED, its temperature rises rapidly after starting illumination, and when its temperature approaches the reliability assurance temperature, it is maintained at the reliability assurance temperature or less due to the cooling action by the cooling fan. With regard to the blue LED, it can be seen that the heat generation by power consumption and the cooling action by the heat sink and the cooling fan are balanced so that its junction temperature is maintained at the reliability assurance temperature or less. With regard to the red LED, its light emission efficiency drops when its junction temperature rises to the reliability assurance temperature. Therefore, the red LED is heated or cooled by absorbing heat by the Peltier device so as to control the junction temperature below the reliability assurance temperature and to be constant at 100° C.

Figure 3:
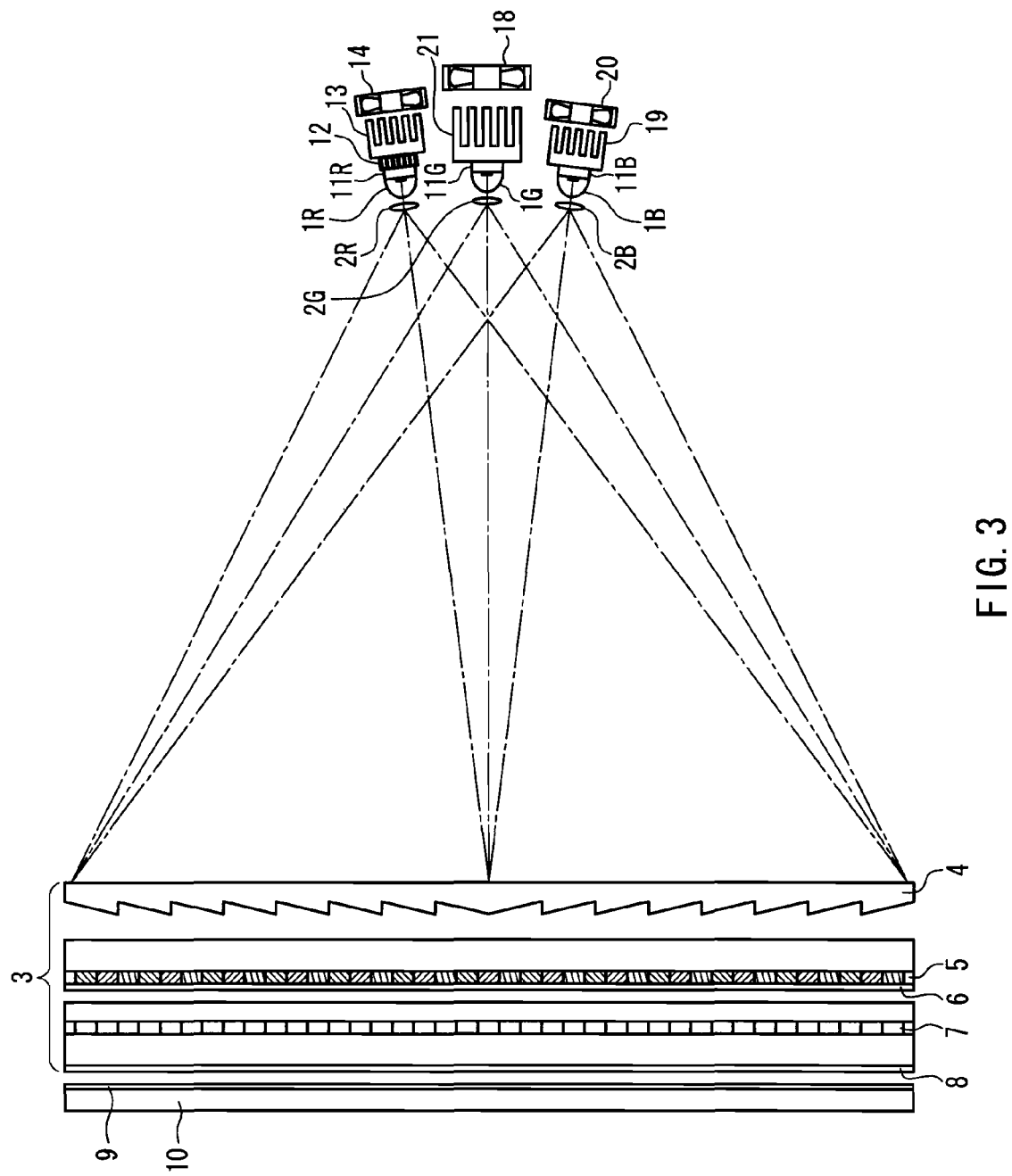
FIG. 3 is a plan view showing other configuration of the image display device according to Embodiment 1 of the present invention.

Further, depending on the amount of heat to be dealt with, it is possible to have the configuration as shown in FIG. 3. In this configuration, a heat sink 21 is connected to the back of the green LED module 1G through a spreader 11G as a thermal conductive member.

Although the green LED module 1G needs to be maintained at the reliability assurance temperature or less, it does not have to be maintained in a constant temperature range like the red LED module 1R. Although the reliability assurance temperature affects the life spans, a required life span changes depending on the application purposes. When the life span is of low priority, it is possible to have such a simple configuration.

As described above, the green LED module only needs to be supplied with a large input power and to be maintained at the reliable assurance temperature or less. By taking this into account, a liquid cooling system or heat sink with a small thermal resistance and a high cooling capability may be used for the green LED module.

Although the image display device according to the present embodiment is configured to be applied to a liquid crystal monitor or a liquid crystal television, its application is not limited to these. The image display device according to the present embodiment can also be applied to a projection-type image display device by using a small liquid crystal module for a projector and including a projection optical system.

When applying the image display device of the present embodiment to a projection-type image display device, the image display element is not limited to a transmissive liquid crystal display element as in the example described above. The light sources of the present embodiment can also be applied to a DMD (digital micro-mirror device) or a reflection liquid crystal display device.

Embodiment 2

Figure 4:
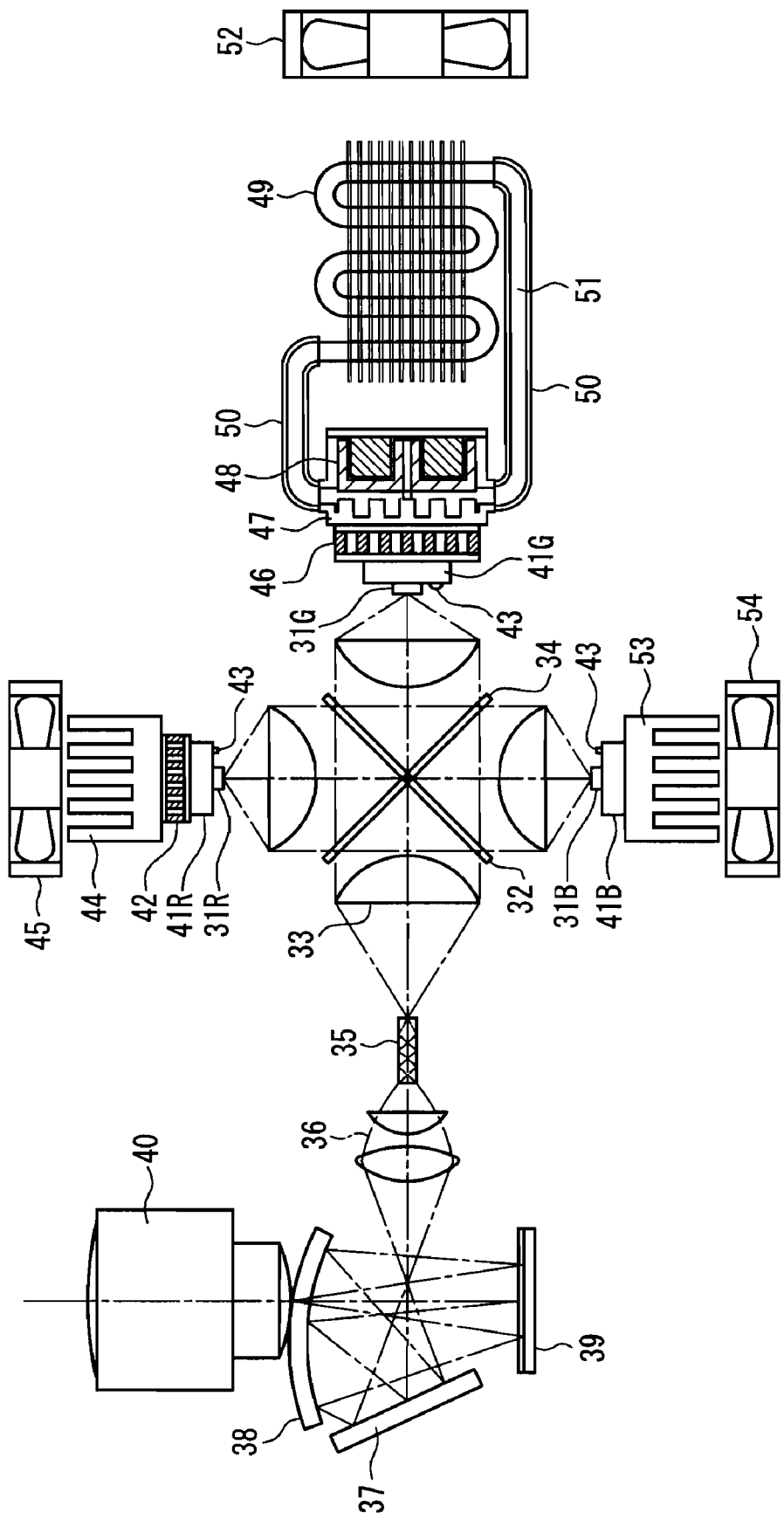
FIG. 4 is a plan view showing a configuration of an image display device according to Embodiment 2 of the present invention.

FIG. 4 shows a configuration of an image display device according to Embodiment 2 of the present invention. This image display device is a projection-type image display device having a projection optical system. In this device, LED modules for R, G and B colors of light, namely, a red LED module 31R, a green LED module 31G and a blue LED module 31B are provided.

Although it is not shown in the drawing, the LED modules 31R, 31G and 31B for the respective colors of light as solid light sources have a configuration in which an LED die is mounted on a metal substrate for dissipating heat with an insulation layer being interposed between the die and the substrate. The LED die is connected to an LED driving power supply through an electrode, and a converging lens is placed in front of the LED die.

Light outputted from the red LED module 31R enters a red reflecting dichroic mirror 32, and is reflected by the mirror to enter a condensing optical system 33. Light outputted from the green LED module 31G enters the red reflecting dichroic mirror 32 and a blue reflecting dichroic mirror 34 and transmits through the both mirrors to enter the condensing optical system 33. Light outputted from the blue LED module 31B enters the blue reflecting dichroic mirror 34 and is reflected by the mirror to enter the condensing optical system 33.

The light that passed through the condensing optical system 33 enters a rod integrator 35. After being totally-reflected for a repeated number of times, the light passes through an illumination optical system 36, a planar mirror 37 and a concave mirror 38 and reaches a DMD 39 as an image display element. The illumination optical system 36, the planer mirror 37 and the concave mirror 38 are designed so that the output surface of the rod integrator 35 has a conjugate relationship with the effective surface of the DMD 39. A projection lens 40 is placed in front of the DMD 39 and an image on the DMD 39 is magnified and projected onto a screen (not shown).

The DMD 39 is composed of micro mirrors that are arranged two-dimensionally, and each mirror is turned on/off at high speed to change the inclination. Light reflected by the mirrors in the off state deviates from the optical path that is oriented toward the projection lens 40, and light reflected by the mirrors in the on state enters the projection lens 40.

Further, a color display is performed by turning on the LED modules 31R, 31G and 31B for the respective colors of light in sequence at high speed and controlling the DMD 39 in sync with the sequential illumination.

A red Peltier device 42 as a thermoelectric element is provided on the back of the red LED module 31R through a red spreader 41R as a thermal conductive member. Further, a thermo sensor 43 is provided in the vicinity of the red LED module 31R.

On the basis of an output from the thermo sensor 43, a control circuit (not shown) performs feedback control on the red Peltier device 42 so as to maintain the junction temperature of the red LED module 31R to be constant. It is to be noted that an output signal obtained by adjusting the output from the thermo sensor 43 in view of the thermal resistance from the position of the thermo sensor 43 to the junction position is used in the feedback control. On the basis of the feedback control, the spreader 41R is heated or cooled by absorbing heat by the red Peltier device 42.

For the red Peltier device 42, it is desirable to use a highly reliable Peltier device in which distortion buffering layers for relieving distortions are provided between a thermoelectric material and ceramics provided on both ends of the thermoelectric material. As a result, high reliability can be ensured when heating or cooling by absorbing heat is performed.

Through a thermal conductive material such as thermal conductive grease, a heat sink 44 is brought into intimate contact with the surface of the red Peltier device 42 opposite to the surface provided with the spreader 41R. And in the vicinity of the heat sink 44, a cooling fan 45 is provided.

Further, a green Peltier device 46 as a thermoelectric element is provided on the back of the green LED module 31G through a spreader 41G as a thermal conductive member. The thermo sensor 43 is provided in the vicinity of the green LED module 31G. On the basis of an output from the thermo sensor 43, the control circuit (not shown) performs feedback control on the green Peltier device 46 so as to maintain the junction temperature of the green LED module 31G to be constant. It is to be noted that an output signal obtained by adjusting the output from the thermo sensor 43 in view of the thermal resistance from the position of the thermal sensor 43 to the junction position is used in the feedback control. On the basis of the feedback control, heating or cooling by absorbing heat from the spreader 41G is performed.

Unlike the red Peltier device 42, the green Peltier device 46 does not adopt a configuration in which distortion buffering layers for relieving distortions are provided between a thermoelectric material and ceramics provided on both ends of the thermoelectric material. When the distortion buffering layers are provided, a thermal resistance in the Peltier device increases, so that a temperature adjusting capability cannot be achieved sufficiently. Thus, as described above, this configuration is not suited for the green Peltier device 46 that deals with an amount of heat larger than that of the red Peltier device 42.

On the other hand, with regard to the green LED, its light emission efficiency and wavelength shift are less sensitive to temperature than those of the red LED, so that ensuring its reliability only requires assuring its junction temperature to be a certain temperature or less. Therefore, a high-capacity Peltier device for cooling by absorbing heat only is adopted for the green Peltier device 46.

A heat receiving unit 47 of a cooling module comes into contact with the surface of the green Peltier device 46 opposite to the surface provided with the spreader 41G. The cooling module further includes a pump 48, a radiator 49, a pipe 50 for connecting the respective units to each other and a refrigerant 51 for transferring the entire heat. Similarly to the red LED module 31R, a cooling fan 52 is placed in the vicinity of the radiator 49.

This cooling module needs to dissipate, to a sufficient degree, heat generated by the power required for the cooling operation of the green Peltier device 46 by absorbing heat as well as heat generated by the power inputted to the green LED module 31G. Thus, the present embodiment employs an overall configuration in which large-sized heat sinks can be placed and the heat sinks can be placed at positions that are less likely to be affected by an increase in heat in the set.

A heat sink 53 is brought into intimate contact with the back of the blue LED module 31B through a spreader 41B as a thermal conductive member, and a cooling fan 54 is placed in the vicinity of the heat sink 53.

Unlike the green LED module 31G, since the blue LED module 31B does not generate a large amount of heat and its performance is less affected by temperature, this configuration may be adequate.

Figure 5:
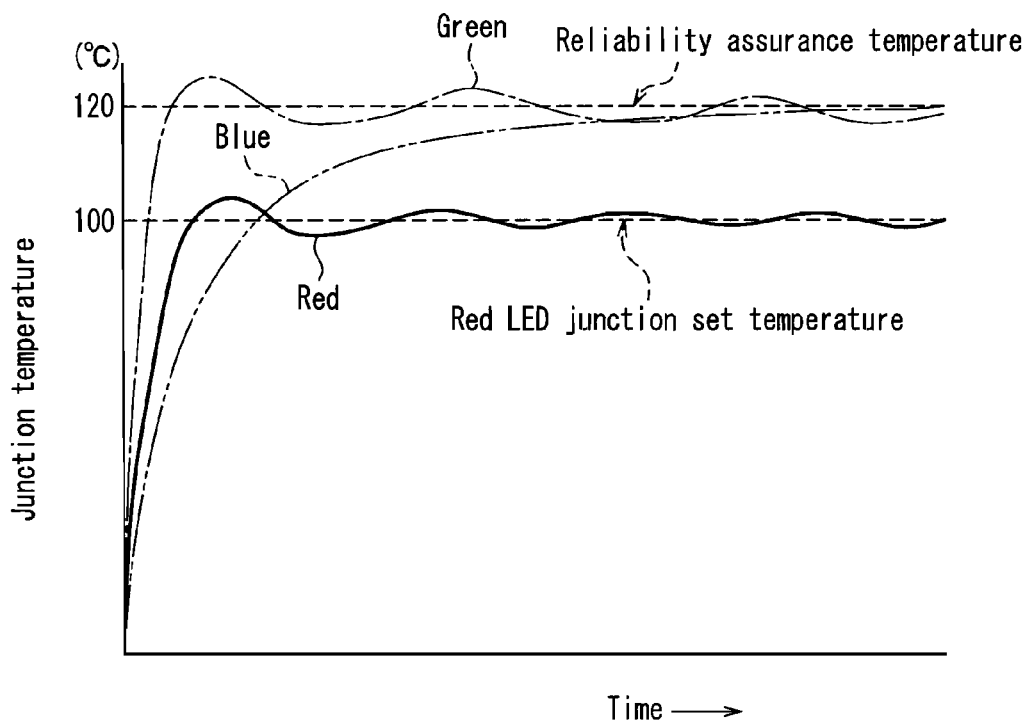
FIG. 5 is a graph showing a state of LED junction temperature control in the same image display device.

FIG. 5 shows a state of LED junction temperature control in the image display device having the configuration as described above. The vertical axis indicates junction temperature and the horizontal axis indicates a lapse of time after starting illumination.

When the red, green and blue LED modules are driven beyond the reliability assurance temperature, target life spans cannot be achieved due to a decline in brightness. Thus, they need to be maintained at a temperature equal to or less than the reliability assurance temperature. In FIG. 5, the reliability assurance temperature is 120° C.

As can be seen from the drawing, with regard to the green LED, its temperature rises rapidly after being illuminated, and when its temperature reaches near the reliability assurance temperature, it is maintained at the reliability assurance temperature or less by the cooling action by the Peltier device absorbing heat. With regard to the blue LED, it can be seen that the heat generation by power consumption and the cooling action by the heat sink and the cooling fan are balanced so that its junction temperature is maintained at the reliability assurance temperature or less. With regard to the red LED, its light emission efficiency drops when its junction temperature rises to the reliability assurance temperature. Therefore, the red LED is heated and cooled by absorbing heat by the Peltier device so as to control the junction temperature to be less than the reliability assurance temperature and also to be constant at 100° C.

Similarly to Embodiment 1, when the life spans are of low priority, it is possible not to use a liquid cooling system for the green LED module also in the present embodiment.

A temperature control configuration similar to that in the present embodiment can also be applied to a transmissive image display device as in Embodiment 1.

Industrial Applicability

The image display device of the present invention is capable of cooling the solid light sources efficiently and so is useful for an image display device using a plurality of solid light sources that emit colors of light different from each other, such as a projector.

The invention claimed is:
1. An image display device comprising:
   a plurality of solid light sources comprising a first light source for emitting red light, a second light source for emitting green light and a third light source for emitting blue light;

a thermo sensor placed in the vicinity of at least the first light source;
an illumination optical system for guiding light from the plurality of solid light sources; and
an image display element for modulating the light from the plurality of solid light sources guided by the illumination optical system on the basis of an image signal,
wherein each of the plurality of solid light sources is provided with a respective cooling unit connected to a backside thereof through a thermal conductive member,
the cooling unit connected to the first light source comprising a first thermoelectric element and the cooling unit connected to the second light source comprising a second thermoelectric element,
among the first and second thermoelectric elements, only the first thermoelectric element is controlled to be capable of heating and absorbing heat, whereby the first light source is controlled so that a junction temperature thereof is maintained at a constant temperature in accordance with a temperature detected by the thermo sensor, and
the second thermoelectric element has a larger capacity than the first thermoelectric element and is controlled to be capable of only absorbing heat.

2. The image display device according to claim 1,
wherein the plurality of cooling units include a cooling unit having a heat sink connected to the thermal conductive member and a cooling unit having a heat sink connected to the thermal conductive member through the thermoelectric element.

3. The image display device according to claim 1,
wherein at least one of the cooling units includes a heat receiving unit connected to the thermal conductive member, a pipe connected to the heat receiving unit, a pump connected to the pipe, a refrigerant driven by the pump so as to be circulated through the pipe, and a radiator placed on the pipe, and
the refrigerant is circulated to remove heat from the heat receiving unit after being cooled by the radiator.

4. The image display device according to claim 3
wherein the thermoelectric element is placed so as to be interposed between the thermal conductive member and the heat receiving unit.

5. The image display device according to claim 1,
wherein the cooling unit for the third light source has a heat sink connected to the thermal conductive member,
the cooling unit for the first light source has a heat sink connected to the thermal conductive member through the first thermoelectric element,
the cooling unit for the second light source has a heat receiving unit connected to the thermal conductive member through the second thermoelectric element, a pipe connected to the heat receiving unit, a pump connected to the pipe, a refrigerant driven by the pump so as to be circulated through the pipe, and a radiator placed on the pipe, whereby the refrigerant is circulated to remove heat from the heat receiving unit after being cooled by the radiator.

6. The image display device according to claim 1, wherein the thermoelectric elements are Peltier devices.

7. The image display device according to claim 1, further comprising a projection optical system provided so that an image on the image display element can be projected onto a screen placed in front of the image display device.

* * * * *